(12) United States Patent
Norquist et al.

(10) Patent No.: US 10,574,707 B1
(45) Date of Patent: Feb. 25, 2020

(54) REDUCING LATENCY ASSOCIATED WITH COMMUNICATIONS

(71) Applicant: AMAZON TECHNOLOGIES, INC., Seattle, WA (US)

(72) Inventors: Skeets Jonathan Norquist, Ridgefield, WA (US); Tenghui Liu, San Jose, CA (US); Joe Thomas, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 145 days.

(21) Appl. No.: 15/632,245

(22) Filed: Jun. 23, 2017

(51) Int. Cl.
| | | |
|---|---|---|
| *H04L 29/08* | (2006.01) | |
| *H04L 29/06* | (2006.01) | |
| *G06F 15/173* | (2006.01) | |
| *H04W 72/04* | (2009.01) | |

(52) U.S. Cl.
CPC ...... *H04L 65/1069* (2013.01); *H04L 65/1006* (2013.01); *H04L 65/1066* (2013.01); *H04L 65/80* (2013.01); *H04W 72/0406* (2013.01)

(58) Field of Classification Search
USPC ............... 709/227, 204, 206, 228, 223, 229
See application file for complete search history.

(56) References Cited

U.S. PATENT DOCUMENTS

| | | | |
|---|---|---|---|
| 8,402,433 B2 | 3/2013 | Wood et al. | |
| 8,438,028 B2 | 5/2013 | Chengalvarayan et al. | |
| 8,493,968 B2 * | 7/2013 | Houle | G06F 8/65 370/352 |
| 9,197,587 B2 | 11/2015 | Bansal et al. | |
| 9,203,874 B2 | 12/2015 | Kadishay et al. | |
| 9,344,575 B2 | 5/2016 | Ding et al. | |
| 10,032,451 B1 | 7/2018 | Mamkina et al. | |
| 10,074,371 B1 * | 9/2018 | Wang | G10L 15/22 |
| 10,108,791 B1 | 10/2018 | Masterman | |
| 10,135,911 B2 * | 11/2018 | Yasrebi | H04L 65/4084 |
| 2004/0128355 A1 | 7/2004 | Chao et al. | |

(Continued)

OTHER PUBLICATIONS

Jean Gilles, Jude, "Non-final Office Action dated Apr. 19, 2019", U.S. Appl. No. 15/632,241, The United States Patent and Trademark Office, Apr. 19, 2019.

(Continued)

*Primary Examiner* — Jude Jean Gilles
(74) *Attorney, Agent, or Firm* — Lindauer Law, PLLC

(57) ABSTRACT

Described are techniques for establishing communications sessions between devices. A command from a sender device to initiate a communications session with a recipient device may include information indicative of a recipient user profile. Correspondence between recipient information and sender contact data may be used to determine the recipient user profile. Prior to providing a communication request to the recipient device, recipient contact data may be determined using the recipient user profile. Correspondence between the sender user profile and the recipient contact data may be used to determine sender information indicative of the sender. This information may be provided to the recipient device in advance of the communication request to enable more rapid acceptance of the communication request and eliminate the delay that would be incurred if the recipient device determined the sender information responsive to the communication request.

20 Claims, 8 Drawing Sheets

(56) References Cited

U.S. PATENT DOCUMENTS

| | | | |
|---|---|---|---|
| 2005/0193117 A1* | 9/2005 | Morris | H04L 51/14 709/227 |
| 2006/0149558 A1 | 7/2006 | Kahn et al. | |
| 2007/0192465 A1* | 8/2007 | Modarressi | H04L 67/02 709/223 |
| 2009/0217337 A1* | 8/2009 | Åström | H04N 7/17318 725/115 |
| 2010/0034166 A1* | 2/2010 | Olvera-Hernandez | H04W 36/24 370/331 |
| 2010/0083142 A1 | 4/2010 | Patel et al. | |
| 2010/0283827 A1* | 11/2010 | Bustamente | H04L 29/12433 348/14.08 |
| 2010/0287286 A1* | 11/2010 | Bustamente | H04L 63/0407 709/228 |
| 2012/0072501 A1* | 3/2012 | Amar | H04L 29/12094 709/206 |
| 2013/0232213 A1* | 9/2013 | Bustamente | H04W 4/21 709/206 |
| 2014/0366111 A1 | 12/2014 | Sheller et al. | |
| 2015/0088998 A1 | 3/2015 | Isensee et al. | |
| 2015/0256137 A1 | 9/2015 | Kapinos et al. | |
| 2016/0077794 A1 | 3/2016 | Kim et al. | |
| 2017/0289168 A1 | 10/2017 | Bar et al. | |
| 2018/0309866 A1* | 10/2018 | Devaraj | H04L 67/306 |
| 2018/0316978 A1 | 11/2018 | Koona et al. | |

OTHER PUBLICATIONS

Jean Gilles, Jude, "Notice of Allowance dated Sep. 30, 2019", U.S. Appl. No. 15/632,241, The United States Patent and Trademark Office, Sep. 30, 2019.

* cited by examiner

… (US 10,574,707 B1)

REDUCING LATENCY ASSOCIATED WITH COMMUNICATIONS

BACKGROUND

When initiating a communications session between devices that utilize particular hardware components, such as cameras, the initialization of the cameras may cause a delay before the participants can conduct their video conference. Additionally, when the devices store contact data or other information at a location remote from the devices, the processing of the communication request to determine contact information may also delay initiation of the communications session.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
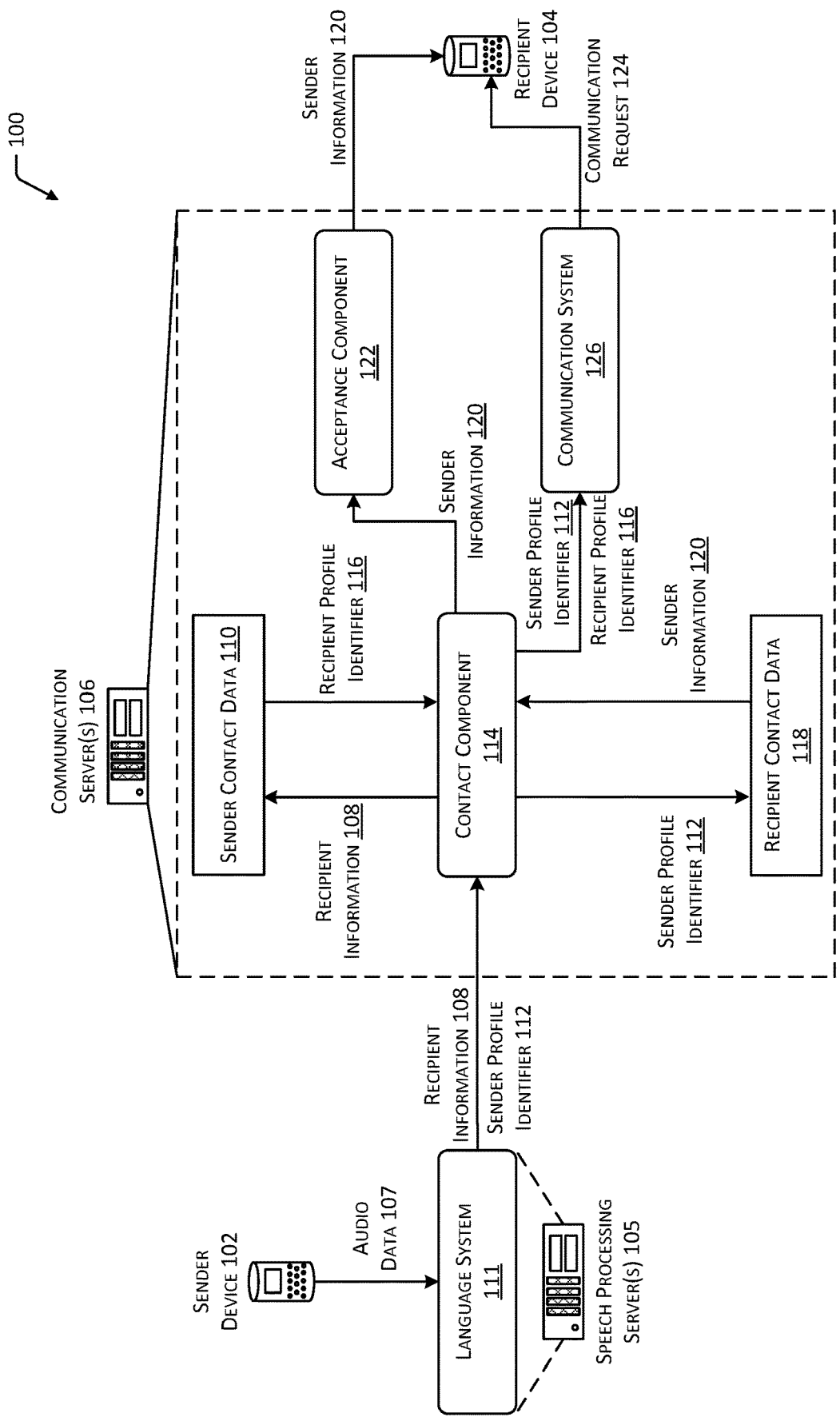
FIG. 1 depicts an implementation of a system for initiating a communications session between a sender device and a recipient device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many types of devices may be used to initiate a communications session with other devices. A communications session may include an establishment of one or more channels of communication between two computing devices, which may be used to transmit data between the computing devices. For example, a communications session established between devices may include use of a Session Initiation Protocol (SIP) to transmit audio data between devices, such as when conducting a voice over internet protocol (VOIP) call. As another example, a communications session that includes the transmission of video data between devices may include use of a Real-time Transport Protocol (RTP). Typically, to initiate a communications session, a first user inputs a command to a first device (e.g., a sender device) indicating an intent to initiate a communications session and information identifying a second device (e.g., a recipient device) with which to establish the communications session. The sender device then generates a communication request using a particular protocol, such as a Session Initiation Protocol (SIP), and sends the communication request to the recipient device. A user associated with the recipient device may then accept the communication request. Depending on the protocol associated with the communications session, the sender and recipient devices may exchange additional data. For example, devices that initiate an SIP communication may exchange configuration information, such as Session Description Protocols (SDP), to facilitate communication between the devices.

In some cases, at least a portion of the process to initiate a communications session may be performed remotely, such as by one or more servers in networked communication with a communication device. For example, a networked speaker device may be configured to receive audio commands from a user, such as commands to initiate a communications session. In some cases, a contact list associated with the user may be stored at a location remote from the networked speaker device. In such a case, responsive to an audio command to initiate a communications session with a particular recipient, the sender device may send audio data to a remote server, which may determine a recipient device that corresponds to the recipient represented by the audio data. When the recipient device receives the communication request from the sending device, the recipient device may send the communication request to a remote server, which may determine the sender name or other contact information that corresponds to the sender device. This sender information may then be output by the recipient device to enable the recipient of the communication request to determine whether to accept the request. This process of resolving contact information for both the sender device and the recipient device using a remote server may create latency, increasing the length of time between the receipt of the command from the sender and the initiation of a communications session between the devices.

In some cases, a user may input a command to initiate a video communications session with a recipient device that includes, for example, a camera or other type of image sensor. In such a case, after receiving the communication request, the recipient device may begin initializing the camera. However, the initialization of the camera may create a delay and increase the length of time between the receipt of the command from the sender and the initiation of the communications session between the devices. For example, the initialization process for a camera may take one or more seconds.

Described in this disclosure are techniques for reducing the latency associated with initiating a communications session between devices. Audio data received from a sender device, such as the verbal command "Call Bob", may be processed to determine a command to initiate a communications session (e.g., "Call") and recipient information indicative of a recipient device (e.g., "Bob"). Contact data associated with the sender device may associate recipient information, such as names of contacts (e.g., "Bob"), with corresponding device identifiers. Based on correspondence (e.g., a match or partial match) between the recipient information and at least one contact within the contact data, a device identifier that corresponds to the recipient device may be determined. The device identifiers for the sender and recipient devices may be used to generate an SIP invitation or other type of communication request. However, prior to transmitting a communication request to the recipient device, contact data associated with the identified recipient device (e.g., Bob's contact list) may be accessed. Based on correspondence between the identifier associated with the sender device and the contact data associated with the recipient device, sender information, such as a sender name (e.g., "Alice"), may be determined. At least a portion of the sender information may be sent to the recipient device prior to sending the communication request. Then, when the communication request is received by the recipient device, contact information associated with the sender device has already been received by the recipient device and may be immediately output to prompt acceptance or rejection of the communication request. This process may prevent the delay that would be incurred if the recipient device were to begin the process of determining the sender information after the communication request is received.

In some cases, a recipient device may automatically accept communication requests from certain sender devices. For example, a recipient may select particular contacts to be granted permission to send communications without requiring manual acceptance of a communication request by the recipient. In such a case, the contact data for the recipient profile may also include acceptance data that indicates particular sender profiles from which the recipient has chosen to automatically accept communication requests. If the sender information for the sender profile is included in the acceptance data, then responsive to receipt of the sender information, the recipient device may prepare to automatically accept the communication request when it is received.

In some implementations, a user may attempt to initiate a video communications session that utilizes the camera of a recipient device. For example, a recipient device may be configured to initialize a camera responsive to receipt of a video communication request. In such a case, an initialization command to activate or otherwise prepare the camera of the recipient device for use may be sent prior to the communication request. Continuing the example, initialization of a camera or other associated components of a device may include providing power to an image sensor, preparing a video processing subsystem for use, allocating memory for use capturing or transmitting video data, and so forth. In some implementations, the initialization command may be sent to the recipient device concurrent with the sender information. For example, after the identity of the recipient device is determined using the sender contact data, an initialization command may be sent to the recipient device prior to the communication request. Receipt of the initialization command prior to the communication request may enable the device camera of the recipient device to be initialized responsive to the command, such that when the communication request is subsequently received by the recipient device, the device camera has already been initialized. This process may prevent the delay that would be incurred if the recipient device were to begin the camera initialization process responsive to receipt of the communication request. In other implementations initialization commands to activate, prepare, or initialize other hardware or software components of the recipient device may be sent prior to sending a communication request to the recipient device.

In some implementations, sender information or initialization commands may be sent to one or more recipient devices based on confidence scores associated with the audio data or other type of command received from the sender device. For example, when audio data is received from a sender, language processing may be performed on the audio data to determine one or more confidence scores. A first confidence score may be determined that indicates a likelihood that the audio data includes a command to initiate a communications session. Continuing the example, speech-to-text and natural language processing may be performed on the audio data to determine correspondence between the audio data received from the sender and stored audio data indicative of a command to initiate a communications session. The first confidence score may indicate a degree of similarity between the audio data received from the sender and the stored audio data. If the first confidence score exceeds a threshold value, the process of determining sender information to be sent to the recipient device, or the process of sending an initialization command to the recipient device, may be performed responsive to the first confidence score exceeding the threshold value.

As another example, when audio data is received from a sender, a second confidence score may be determined that indicates a likelihood that the audio data references a specific recipient. In some implementations, multiple second confidence scores for multiple possible contacts may exceed a threshold value. For example, a user providing the audible command "Call Bob" may have multiple associated contacts named "Bob", or that have a similar name, that correspond to the audio data. In such a case, sender information or initialization commands may be sent to multiple recipient devices associated with confidence scores that exceed the threshold value. Subsequently, when additional audio data clarifying the identity of the recipient is received from the sender device, a communication request may be sent to a single recipient device indicated by the additional audio data. The sender information and initialization commands sent to other recipient devices may be unused. For example, sender information sent to a recipient device that does not receive a communication request may not be output by the recipient device. As another example, if an initialization command is received by a recipient device, but a communication request is not subsequently received, resources associated with the initialized component(s) may be released after a threshold length of time has lapsed. In other implementations, if the second confidence scores for multiple contacts exceed the threshold value, then sender information or initialization commands may not be sent until a particular recipient device is determined.

As yet another example, when audio data is received from a sender, a third confidence score may be determined that indicates a likelihood that the audio data was input by a specific sender. For example, multiple individuals at a location may be authorized to access a sender device, and the sender device or another computing device in communication therewith may be configured to attempt to identify a sender based on received audio data. Continuing the example, speech recognition technology may be used to compare received audio data with stored audio data associated with one or more senders. The third confidence score for a particular sender may indicate the degree of similarity between the received audio data and the stored audio data for the particular sender. If the third confidence scores for multiple senders exceed a threshold value, sender information for multiple senders may be sent to the recipient device. Subsequently, when additional audio data clarifying the identity of the sender is received from the sender device, the sender information corresponding to the determined sender may be used to determine acceptance of the communication request by the recipient device.

In some implementations, sender information or initialization commands may be sent to a recipient device responsive to presence data, calendar data, or timer data. For example, presence data may indicate that a particular user or a count of users is within a threshold distance of a recipient device or that user input from a particular user or count of users has been received by the recipient device. Continuing the example, presence data may indicate that a particular user is proximate to a recipient device located in a first room of a structure, but not proximate to a different recipient device located in a second room. Therefore, sender information or initialization commands may be sent to the recipient device in the first room based on the presence data. Presence data may be determined using one or more cameras, motion sensors, or touch sensors associated with a recipient device, by detecting a personal device carried by a user, and so forth. As another example, calendar data or timer data may indicate that a recipient device is scheduled to receive a communication at a particular time. Based on one or more of the presence data, the calendar data, or the timer data, a recipient device may be provided with an initialization command to initialize a camera or one or more other components, sender information corresponding to one or more sender devices, and so forth.

FIG. 1 depicts an implementation of a system 100 for initiating a communications session between a sender device 102 and a recipient device 104. The sender device 102 and recipient device 104 may include any type of computing device capable of receiving user input and outputting sound. For example, the sender device 102 and recipient device 104 may each include one or more microphones and speakers, such that user input received by a microphone of a first device may cause sound to be output using a speaker of a second device. In some implementations, one or more of the sender device 102 or recipient device 104 may be configured to receive video user input and output video data. For example, the sender device 102 and recipient device 104 may each include one or more cameras and displays, such that user input received by a camera of a first device may cause output of one or more images or videos using a display of a second device. While FIG. 1 depicts the sender device 102 and recipient device 104 as freestanding speaker devices, in other implementations, the sender device 102 and recipient device 104 may include any type of computing device including, without limitation, a server, a desktop, laptop, or other type of personal computer, a smartphone, notebook, tablet computer, palm-top computer, or other type of portable computing devices, a wearable computing device, an automotive computing device, a gaming system, a smart television, a set-top box, and so forth. Additionally, while FIG. 1 depicts a single sender device 102 and a single recipient device 104, any of the functions described herein with regard to either the sender device 102 or the recipient device 104 may be performed using multiple computing devices. Further, while FIG. 1 illustrates establishment of a communications session between a sender device 102 and a recipient device 104, in other implementations, communications sessions may be established using one or more intermediate devices, such as one or more communication severs 106. For example, a communications session may be established between a first server instance and a second server instance, each associated with the communication server(s) 106. The sender device 102 may then exchange data with the first server instance, and the recipient device 104 may exchange data with the second server instance.

In some implementations, the sender device 102 and the recipient device 104 may communicate, via one or more networks, with one or more speech processing servers 105. The sender device 102 and recipient device 104 may also communicate with one or more communication servers 106. The speech processing servers 105 may receive and process audio data 107 from the sender device 102. For example, a user may provide speech or another type of audible input to a microphone or other type of audio input device associated with the sender device 102. The sender device 102 may provide audio data 107 indicative of the received input to the speech processing server(s) 105. The communication server(s) 106 may facilitate communications between the sender device 102 and recipient device 104, and between other devices in communication with the communication server(s) 106. For example, a communication server 106 may store contact data associated with particular users or devices and generate SIP invitations or similar requests for communication to be sent to devices. While FIG. 1 depicts a single speech processing server 105 and a single communication server 106, in other implementations, the speech processing server 105 and communication server 106 may include any number and any type of computing devices, including without limitation the types of computing devices described with regard to the sender device 102 and recipient device 104.

As discussed previously, the sender device 102 may receive an audio command or other type of user input to initiate a communications session with the recipient device 104. Continuing the example, user input from a first user (e.g., "Alice") may include the audio command "Call Bob". In such a case, the word "call" may indicate a command to initiate a communications session, while the word "Bob" may indicate recipient information 108 indicative of the intended destination of the communications session. The recipient information 108 may not directly identify a recipient user profile or a particular recipient device 104, but may instead correspond to a name or other identifying information of a particular recipient, which may be stored as sender contact data 110. For example, a user may input the name "Bob" as sender contact data 110, however, this user input information may correspond to a particular recipient user profile associated with an individual named James Robert Smith. Other users may input different contact data for this same recipient user profile, such that a first user's audio command "Call Bob" and a second user's audio command "Call James", and a third user's audio command "Call JR" may each reference the same recipient user profile. In other implementations, rather than audio input, the user input may include alphanumeric data or a selection of one or more commands or recipients from a list or menu presented in a user interface. For example, user input selecting recipient information 108 from a list generated using sender contact data 110 may be provided to the sender device 102 using a touch sensor, one or more buttons, or other types of input devices.

In some cases, sender contact data 110 may be stored in association with the communication server(s) 106. In such a case, responsive to the command, the sender device 102 may send at least a portion of the command, or data indicative of the command, to the communication server(s) 106. In cases where the user input provided to the sender device 102 includes audio input, a language system 111 associated with the speech processing server(s) 105 may receive the audio data 107 from the sender device 102 and determine that the audio data 107 includes a command to initiate a communications session and recipient information 108 indicative of a particular recipient. In some implementations, the language system 111 may determine correspondence between the audio input received from a user and user profile data indicative of previous audio input received by one or more users, to determine a sender profile identifier 112 indicative of the user from which the audio input was received. For example, the language system 111 may determine a confidence score indicative of a likelihood that the audio input was received from a particular user. Continuing the example, if the audio input closely matches the user profile data, the confidence score may be greater than if the audio input does not closely match the user profile data. In other implementations, the sender profile identifier 112 may be determined based on the particular sender device 102 from which the audio data 107 was received or other user input provided to the sender device 102.

A contact component 114 associated with the communication server(s) 106 may be used to determine a recipient profile identifier 116 that corresponds to the recipient information 108 received from the sender device 102 based on the sender contact data 110. For example, the contact component 114 may determine the sender contact data 110 that corresponds to the sender profile identifier 112. The sender contact data 110 may associate various recipient information 108 with corresponding recipient profile identifiers 116. For example, the recipient information 108 of the sender contact data 110 may include data that was input by a user associated with the sender device 102, such as names or other identifying data associated with particular other users, that may not necessarily be indicative of the recipient device 104 or recipient profile identifier 116. By determining a match between the recipient information 108 received from the sender device 102 and recipient information 108 of the sender contact data 110, the contact component 114 may determine a particular recipient profile identifier 116 that corresponds to the matched recipient information 108.

In some implementations, a recipient profile identifier 116 may be determined based on a partial match between the received recipient information 108 and the sender contact data 110. For example, the command "Call Bob" may be received, but no recipient information 108 for "Bob" may exist in the sender contact data 110. However, recipient information 108 for "Rob" or "Bobby" may exist in the sender contact data 110. In such cases, the contact component 114 may determine confidence scores indicative of the correspondence between the recipient information 108 received from the sender device 102 and the sender contact data 110. In some implementations, the recipient profile identifier 116 associated with the greatest confidence score may be determined. In other implementations, the recipient profile identifiers 116 for multiple recipient devices 104 associated with confidence scores that exceed a threshold may be determined. In still other implementations, the contact component 114 or the sender device 102 may cause a prompt requesting additional user input from the user to be output. For example, the sender device 102 may output the question "Did you want to call Rob or did you want to call Bobby?", responsive to which the user may provide additional user input, such as speech or other user input indicating recipient information 108 that more closely corresponds to a single recipient profile identifier 116 of the sender contact data 110.

In some implementations, the recipient information 108 received from the sender device 102 may closely correspond to multiple recipient profile identifiers 116 of the sender contact data 110. For example, responsive to the command "Call Bob", the contact component 114 may determine that the sender contact data 110 includes recipient information 108 for "Bob Jones" and "Bob Smith". In some cases, the contact component 114 may determine the recipient profile identifiers 116 for multiple recipient devices 104. In other cases, a prompt may be sent to the sender device 102 to determine additional user input. In other implementations, the recipient information 108 received from the sender device 102 may not correspond to any recipient information 108 of the sender contact data 110 with a threshold level of confidence. In such cases, a prompt may be sent to the sender device 102 to determine additional user input, or a notification may be sent to the sender device 102 that a contact corresponding to the recipient information 108 was not determined.

After determining a recipient profile identifier 116 that corresponds to the recipient information 108, the contact component 114 may determine recipient contact data 118 that corresponds to the recipient profile identifier 116. In cases where the contact component 114 determines recipient profile identifiers 116, the process described below may be performed with regard to multiple recipient profile identifiers 116. The recipient contact data 118 may associate sender information 120, which may include user input data associated with senders, such as names or other identifying information, with corresponding sender profile identifiers 112. Based on the sender profile identifier 112 associated with the command received from the sender device 102, the contact component 114 may determine a matching sender profile identifier 112 in the recipient contact data 118 and sender information 120 that corresponds to the matching sender profile identifier 112. In some implementations, a sender profile identifier 112 may correspond to sender information 120 for multiple senders. For example, multiple users at a location may be authorized to access a sender device 102. In such cases, the contact component 114 or another component associated with the communication server(s) 106 may attempt to identify a particular sender, such as by use of speech recognition or by sending a prompt for additional user input to the sender device 102. In other cases, the contact component 114 may determine multiple sets of sender information 120.

As discussed previously, a recipient device 104 may typically determine sender information 120 responsive to receipt of an SIP invitation or other type of request for communication, which may delay initiation of the communications session. Determination of the sender information 120 by the contact component 114 at or proximate to the time that a request to initiate a communications session is received from the sender device 102 may reduce or eliminate this source of delay in initiation of the communications session. For example, an acceptance component 122 associated with the communication server(s) 106 may send at least a portion of the sender information 120 to the recipient device 104 associated with the recipient profile identifier 116 prior to receipt of a communication request 124, such as an SIP invitation, by the recipient device 104. In some implementations, the sender information 120 may include information indicative of a particular user or user profile. For example, the sender information 120 may include the name of a user, stored as recipient contact data 118. In other implementations, the sender information 120 may include information indicative of the sender device 102. For example, if a user located in a first room of a dwelling accesses a sender device 102 to initiate a communications session with a recipient device 104 in a second room of the dwelling, the sender information 120 may indicate the room of the dwelling in which the sender device 102 is located.

A communication system 126 associated with the communication server(s) 106 may generate the communication request 124 based at least in part on the sender profile identifier 112 and the recipient profile identifier 116. For example, an SIP invitation may include identifying information associated with the source device (e.g., the sender device 102) and the destination device (e.g., the recipient device 104), as well as configuration information associated with the source device, such as an SDP for the sender device 102. An acceptance of the communication request 124 by the recipient device 104 may include an SDP for the recipient device 104.

In some implementations, the recipient device 104 may send an acceptance of the communication request 124 responsive to the sender information 120, prior to receipt of the communication request 124. For example, the sender information 120 may be output by the recipient device 104 responsive to which user input may be used to accept the communication request 124 associated with the sender device 102. As another example, acceptance data associated with the recipient device 104 may indicate that the recipient user profile is configured to automatically accept communication requests 124 from the particular sender user profile associated with the communication request 124. In other implementations, the recipient device 104 may not send an acceptance of the communication request 124 until the communication request 124 is received by the recipient device 104. However, in such a case, the delay associated with determining the sender information 120 responsive to the communication request 124 may still be eliminated due to the provision of the sender information 120 to the recipient device 104 in advance of the communication request 124.

Figure 2:
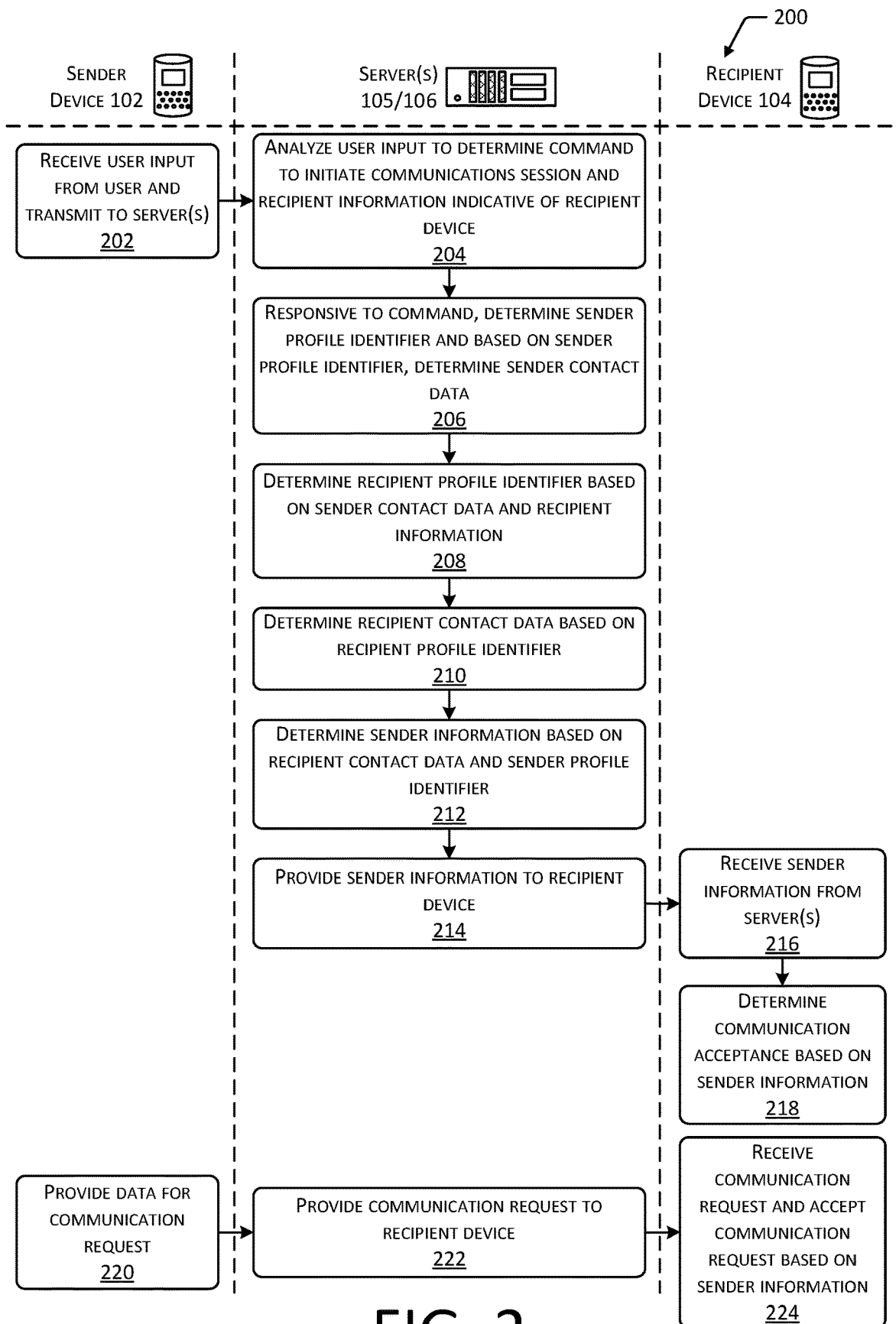
FIG. 2 is a flow diagram depicting a process for initiating a communications session between a sender device and a recipient device.

FIG. 2 is a flow diagram 200 depicting a process for initiating a communications session between a sender device 102 and a recipient device 104. At 202, a sender device 102 may receive user input from a user and transmit data indicative of at least a portion of the user input to one or more communication server(s) 106. In some implementations, the user input may include audio input, such as an audible command. In other implementations, user input may include one or more of alphanumeric data, image data, video data, haptic data, and so forth that may be provided using one or more input devices associated with the sender device 102. At 204, the one or more of the speech processing server(s) 105 or the communication server(s) 106 may analyze the user input to determine the command to initiate the communications session and recipient information 108 indicative of the recipient device 104. For example, if audio data 107 indicative of audio input provided by a user is received from the sender device 102, the language system 111 associated with the speech processing server(s) 105 may process the audio data 107. Continuing the example, a speech-to-text component may generate alphanumeric data based on the audio data 107. A natural language processing component may determine a command to initiate a communications session and recipient information 108 indicative of the recipient device 104 based on the alphanumeric data. As another example, a language system 111 may determine the command and recipient information 108 based on the audio data 107 without generating alphanumeric data. In cases where other types of user input, such as alphanumeric data, image data, video data, haptic data, and so forth are received from the sender device 102, one or more other components associated with the communication server(s) 106 may be configured to determine the command to initiate the communications session and the recipient information 108 based on the user input.

At 206, responsive to the command, the speech processing server(s) 105 or communication server(s) 106 may determine a sender profile identifier 112 associated with the user input received from sender device 102. For example, in some implementations, speech recognition may be used to determine the sender profile identifier 112 corresponding to a user providing audio input to the sender device 102. As another example, the presence of a particular user in proximity to the sender device 102 may be determined using one or more cameras, by detecting one or more devices carried by the user, and so forth. As yet another example, a user may access a sender user profile when providing user input to the sender device 102. In some cases, a user may provide user input using a personal device, such as a smartphone or other computing device associated with a particular sender user profile, and the sender profile identifier 112 may be determined based on the device from which the user input is received. Based on the determined sender profile identifier 112, the communication server(s) 106 may determine sender contact data 110 that corresponds to the sender profile identifier 112. For example, multiple senders may store contact data, in association with respective sender profiles, in the communication server(s) 106. Each contact data may include an indication of the associated sender profile identifier 112. The sender contact data 110 associated with the user providing user input to the sender device 102 may be stored in association with an indication of the sender profile identifier 112. The communication server(s) 106 may determine the associated sender contact data 110 by determining correspondence between the sender profile identifier 112 associated with the received user input and the sender profile identifier 112 stored in association with the sender contact data 110.

At 208, the communication server(s) 106 may determine the recipient profile identifier 116 associated with recipient information 108 received from the sender device 102 based on the sender contact data 110. For example, the sender contact data 110 may associate recipient information 108 for multiple recipient user profiles, such as contact names or other identifying information that may be input by a user, with corresponding recipient profile identifiers 116. A contact component 114 associated with the communication server(s) 106 may determine correspondence between the recipient information 108 received from the sender device 102 and the sender contact data 110 to determine a recipient profile identifier 116 that corresponds to the received recipient information 108. For example, if the recipient information 108 received from the sender device 102 at least partially matches recipient information 108 in the sender contact data 110, this may indicate that the recipient profile identifier 116 that corresponds to the matching recipient information 108 also corresponds to the recipient information 108 received from the sender device 102.

At 210, the recipient contact data 118 associated with the recipient profile identifier 116 may be determined. The communication server(s) 106 may determine the contact data associated with the recipient profile identifier 116 by determining correspondence between the recipient profile identifier 116 determined from the sender contact data 110 and a recipient profile identifier 116 stored in association with the recipient contact data 118.

At 212, the communication server(s) 106 may determine sender information 120 indicative of the sender user profile based on the recipient contact data 118 and the sender profile identifier 112. For example, the recipient contact data 118 may associate sender profile identifiers 112 with corresponding sender information 120. A contact component 114 associated with the communication server(s) 106 may determine correspondence between the sender profile identifier 112 received from the sender device 102 and at least one sender profile identifier 112 of the recipient contact data 118. If the sender profile identifier 112 from the sender device 102 at least partially matches a sender profile identifier 112 of the recipient contact data 118, this may indicate that the sender information 120 that is associated with the matched sender profile identifier 112 may correspond to the sender profile identifier 112 of the sender device 102.

At 214, the communication server(s) 106 may send at least a portion of the determined sender information 120 to the recipient device 104. For example, an acceptance component 122 associated with the communication server(s) 106 may determine a portion of the sender information 120 to be sent to the recipient device 104. In some implementations, the acceptance component 122 may add, remove, or modify the sender information 120, such as by changing a format thereof, prior to sending the sender information 120 to the recipient device 104.

At 216, the recipient device 104 may receive the sender information 120 from the communication server(s) 106, prior to receiving a communication request 124. At 218, the recipient device 104 may determine acceptance of the communication request 124 based on the sender information 120. As described with regard to FIG. 1, in some implementations, the acceptance may be determined prior to receipt of the communication request 124 by the recipient device 104. In other implementations, the acceptance may be determined concurrent with receipt of the communication request 124 by the recipient device 104. In still other implementations, the acceptance may be determined subsequent to receipt of the communication request 124 by the recipient device 104.

At 220, the sender device 102 may send data for the communication request 124 to the communication server(s) 106. For example, to generate an SIP invitation, the sender device 102 may send data indicative of an SDP to the communication server(s) 106. In some implementations, at least a portion of the communication request 124 may be generated by the sender device 102. In other implementations, all or a portion of the communication request 124 may be generated by the communication server(s) 106.

At 222, the communication server(s) 106 may send the communication request 124 to the recipient device 104. At 224, the recipient device 104 may receive the communication request 124 and accept the communication request 124 based on the sender information 120. In some implementations, the acceptance of the communication request 124 may include an SDP or other configuration data associated with the recipient device 104.

Figure 3:
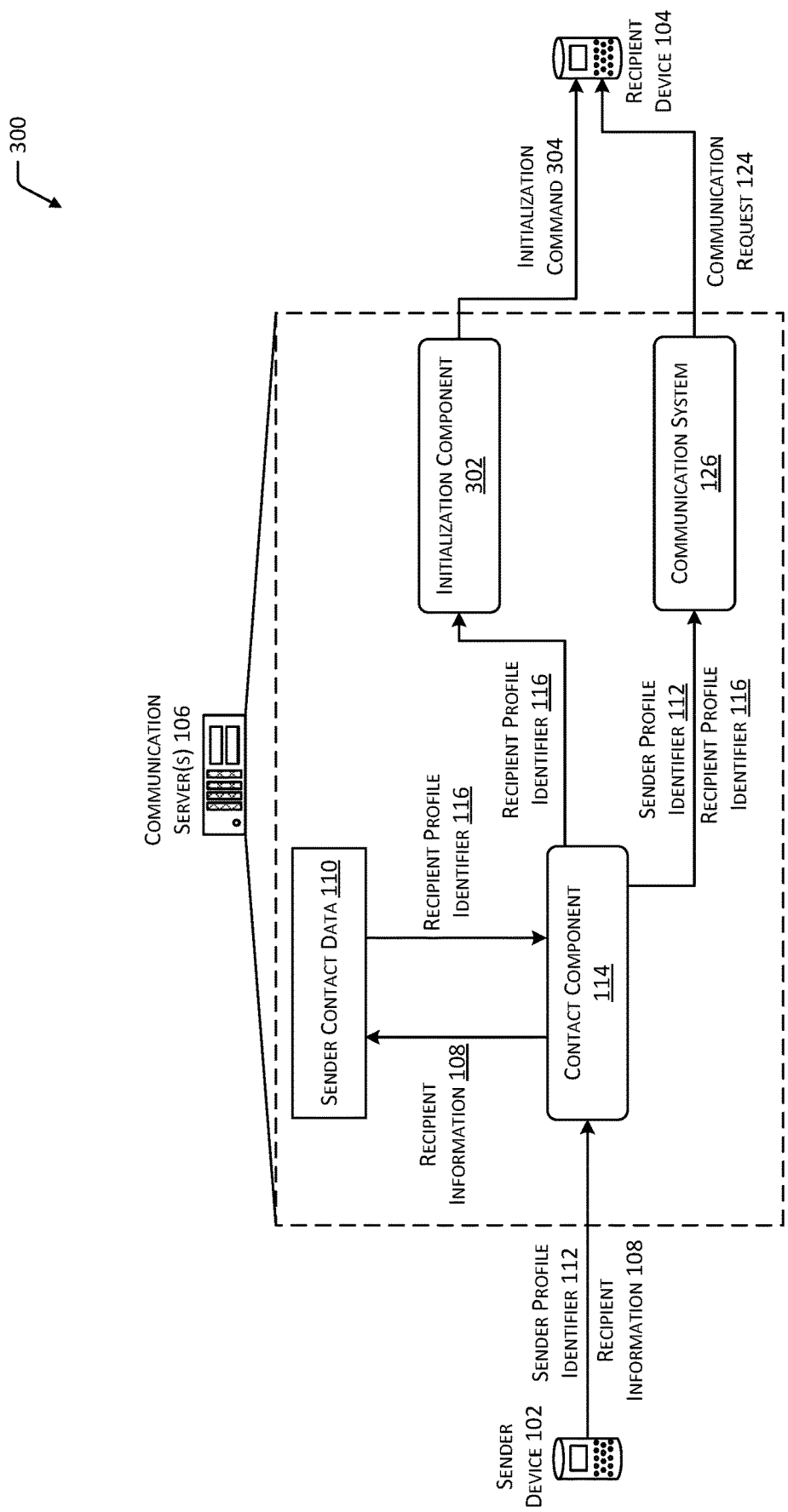
FIG. 3 depicts an implementation of a system for initializing one or more components of a recipient device responsive to a command to initiate a communications session from a sender device.

FIG. 3 depicts an implementation of a system 300 for initializing one or more components of a recipient device 104 responsive to a command to initiate a communications session from a sender device 102. As discussed with regard to FIG. 1, the sender device 102 and recipient device 104 may include any type of computing devices and may communicate with one or more communication servers 106. The sender device 102 may receive user input, such as a user interaction with a touch sensor or other components of the sender device 102, indicative of a command to initiate a communications session with the recipient device 104. In some implementations, the command to initiate the communications session may indicate a type of communication associated with one or more hardware or software components of the recipient device 104. For example, the command received by the sender device 102 may indicate an intent by the user to initiate a video communications session with the recipient device 104, which may utilize one or more cameras associated with the recipient device 104. Continuing the example, the sender device 102 may receive user input, via a touch sensor or other component, indicative of a command to initiate a video call with a contact "Bob". In other implementations, other types of user input may be received, such as an audio command (e.g., the utterance "Start a video call with Bob"), which may be processed by one or more speech processing server(s) 105 as described with regard to FIG. 1. In addition to initiating a communication that utilizes a camera, other types of commands may be associated with other hardware or software components of the recipient device 104. The user input received by the sender device 102 may also include recipient information 108 indicative of the intended destination of the communication request 124, such as a name associated with a contact, which may be stored as sender contact data 110.

As described with regard to FIG. 1, in addition to the recipient information 108, the data sent from the sender device 102 to the communication server(s) 106 may also indicate a sender profile identifier 112 indicative of the sender device 102. In some cases, the communication server(s) 106 may determine the sender profile identifier 112 based on the data received from the sender device 102. For example, in the case of audio input, the speech processing server(s) 105 may determine a particular user providing audio input. As another example, one or more cameras may be used to determine the presence of a particular user proximate to the sender device 102. As yet another example, a personal device associated with a particular user may be detected within proximity of the sender device 102, or the personal device associated with the user may function as the sender device 102. As another example, a user accessing the sender device 102 may provide user input indicative of the sender profile identifier 112. A contact component 114 associated with the communication server(s) 106 may determine the sender contact data 110 that is associated with the sender profile identifier 112. The contact component 114 may then determine the recipient profile identifier 116 that corresponds to the recipient information 108 received from the sender device 102 using the sender contact data 110. For example, the contact component 114 may determine a match or partial match between the recipient information 108 received from the sender device 102 and recipient information 108 of the sender contact data 110. Based on the sender contact data 110 and the corresponding recipient information 108, the contact component 114 may determine a particular recipient profile identifier 116.

In some implementations, the contact component 114 or another component associated with the communication server(s) 106 may determine a confidence score indicative of the likelihood that the recipient information 108 received from the sender device 102 corresponds to a particular recipient profile identifier 116. For example, the confidence score may indicate the degree to which the recipient information 108 received from the sender device 102 matches recipient information 108 associated with the sender contact data 110. If the confidence score exceeds a threshold value, data indicative of the determined recipient profile identifier 116 may be sent to an initialization component 302 associated with the communication server(s) 106. In some cases, if the recipient profile identifiers 116 for multiple recipient devices 104 are associated with confidence scores that exceed a threshold, data indicative of multiple recipient profile identifiers 116 may be sent to the initialization component 302. In other cases, data indicative of the recipient profile identifier 116 associated with the greatest confidence score may be sent to the initialization component 302. In still other cases, the contact component 114 or the sender device 102 may send a prompt requesting additional user input to clarify the intended recipient, responsive to which a user may provide additional user input, such as recipient information 108 that more closely corresponds to a single recipient profile identifier 116 of the sender contact data 110.

The initialization component 302 may determine the recipient device 104 that corresponds to the determined recipient profile identifier 116 and send an initialization command 304 to the recipient device 104. In cases where multiple recipient profile identifiers 116 are determined and sent to the initialization component 302, the initialization component 302 may send initialization commands 304 to multiple recipient devices 104. The initialization command(s) 304 may cause the recipient device(s) 104 to initialize a particular hardware or software component. For example, an initialization command 304 may be configured to cause a recipient device 104 to begin initializing a camera associated therewith.

As discussed previously, a recipient device 104 that receives a communication request 124 to initiate a video communications session may typically begin initializing an associated camera responsive to receipt of the communication request 124, which may delay initiation of the communications session. By sending an initialization command 304 to the recipient device 104 at or proximate to the time that a request to initiate a communications session is received from the sender device 102, prior to receipt of the communication request 124 by the recipient device 104, this source of delay in initiation of the communications session may be reduced or eliminated. The communication system 126 associated with the communication server(s) 106 may generate the communication request 124 based at least in part on the sender profile identifier 112 and the recipient profile identifier 116 and may send a communication request 124, such as an SIP invitation, to the recipient device 104, which may accept the communication request 124. Additionally, in some implementations, the sender device 102 may initialize a camera or other component associated therewith responsive to the command received from a user. In other implementations, an initialization command 304 may be provided to the sender device 102 to cause the sender device 102 to initialize one or more components responsive to receipt of the command by the communication server(s) 106. For example, after the communication sever(s) 106 determine that the user input received from the sender device 102 includes a command to initiate a video communications session, the initialization component 302 may provide an initialization command 304 to the sender device 102.

Figure 4:
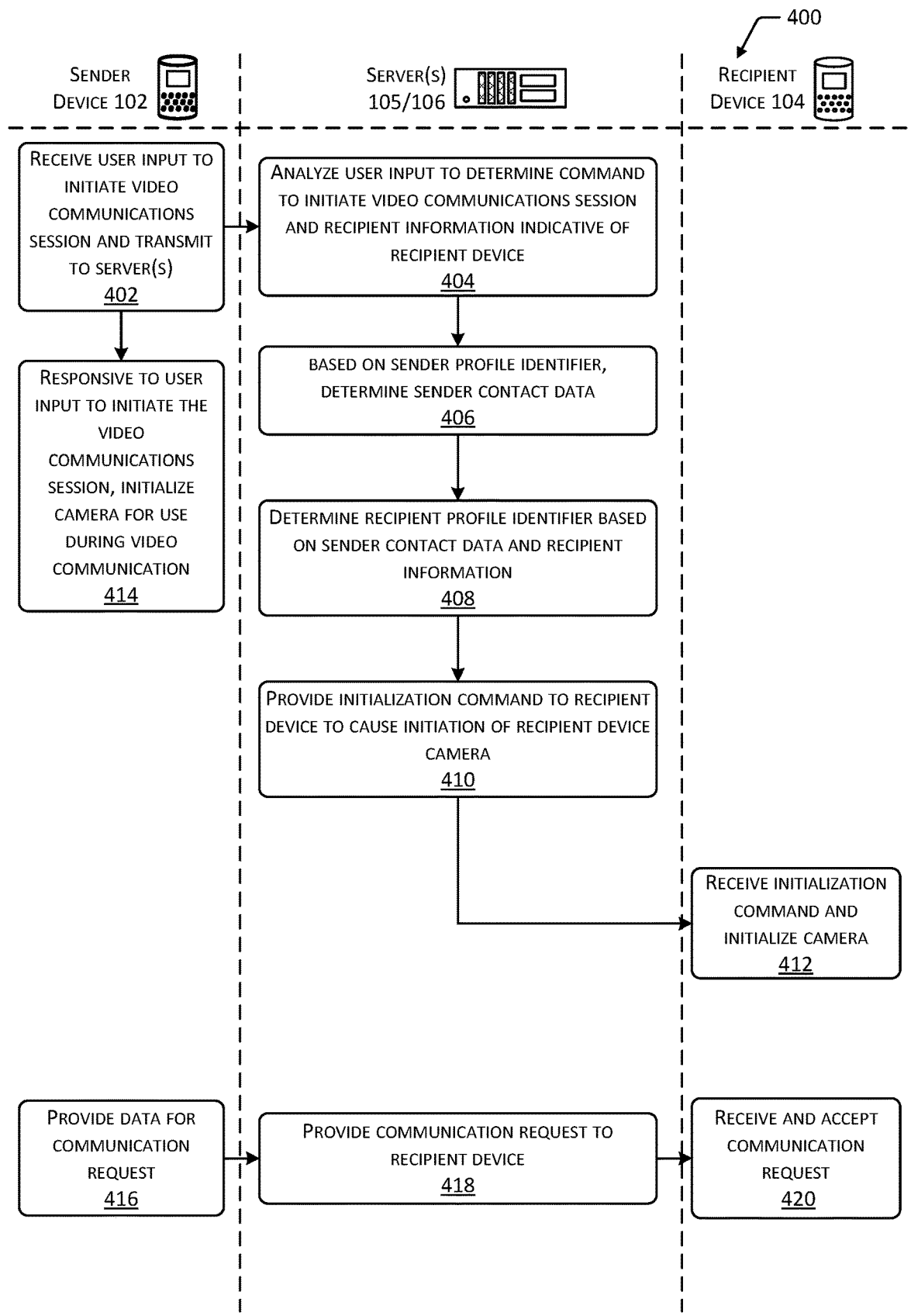
FIG. 4 is a flow diagram depicting a process for initialization of one or more components of a recipient device responsive to a command to initiate a communications session from a sender device.

FIG. 4 is a flow diagram 400 depicting a process for initialization one or more components of a recipient device 104 responsive to a command to initiate a communications session from a sender device 102. At 402, a sender device 102 may receive user input to initiate a video communications session and may transmit data indicative of the user input to the communication server(s) 106. The user input may include one or more of audio data, alphanumeric data, video data, image data, haptic data, or other types of data. For example, the user input may include an audio command received by a microphone associated with the sender device 102.

At 404, one or more of the speech processing server(s) 105 or the communication server(s) 106 may analyze the user input to determine a command to initiate the video communications session and recipient information 108 indicative of the recipient device 104. For example, the user input received from the sender device 102 may include a user-input name or other identifying information indicative of a particular recipient user profile or recipient device 104, stored as sender contact data 110. At 406, based on the sender profile identifier 112 associated with the user input, the communication server(s) 106 may determine the sender contact data 110 that corresponds to the sender.

At 408, based on the sender contact data 110 and the recipient information 108 received from the sender device 102, the communication server(s) 106 may determine the recipient profile identifier 116 associated with the recipient device 104. For example, the sender contact data 110 may associate recipient information 108 with recipient profile identifiers 116. If the recipient information 108 received from the sender device 102 matches recipient information 108 associated with the sender contact data 110, this may indicate that the associated recipient profile identifier 116 corresponds to the recipient information 108 received from the sender device 102. As described with regard to FIG. 3, in some cases, multiple recipient profile identifiers 116 may correspond to the received recipient information 108.

At 410, the communication server(s) 106 may send an initialization command 304 to the recipient device 104 that corresponds to the determined recipient profile identifier 116. At 412, the recipient device 104 may receive the initialization command 304, which may cause the recipient device 104 to initialize a camera associated therewith. In other implementations, initialization commands 304 may cause initialization of other hardware or software components associated with the recipient device 104. For example, an initialization command 304 may cause a recipient device 104 to activate an encoder or decoder, one or more audio components of the recipient device 104, or any other component thereof. In cases where multiple recipient profile identifiers 116 correspond to the recipient information 108 received from the sender device 102, initialization commands 304 may be sent to multiple recipient devices 104. At 414, responsive to the user input to initiate the video communications session, the sender device 102 may also initialize a camera or one or more other components associated therewith, for use during the video communications session. The sender device 102 may initialize an associated camera at any time prior to the acceptance of the communication request 124 by the recipient device 104. For example, an initialization command 304 may be sent to the sender device 102 responsive to receipt of the user input to initiate the video communications session from the sender device 102.

At 416, the sender device 102 may send data for the communication request 124 to the communication server(s)

106. For example, to generate an SIP invitation, the sender device 102 may send an SDP to the communication server(s) 106. The communication request 124 may be generated by the sender device 102, the communication server(s) 106, or both the sender device 102 and the communication server(s) 106.

At 418, the communication server(s) 106 may send the communication request 124 to the recipient device 104. At 420, the recipient device 104 may receive the communication request 124 and accept the communication request 124 based on the sender information 120. In some implementations, the acceptance of the communication request 124 may include an SDP or other configuration data associated with the recipient device 104. At the time the communication request 124 is received by the recipient device 104, initialization of the associated camera or other components may have already begun, and in some cases, may already be completed, which may reduce or eliminate a delay in initiation of the communications session associated with the initialization process.

Figure 5:
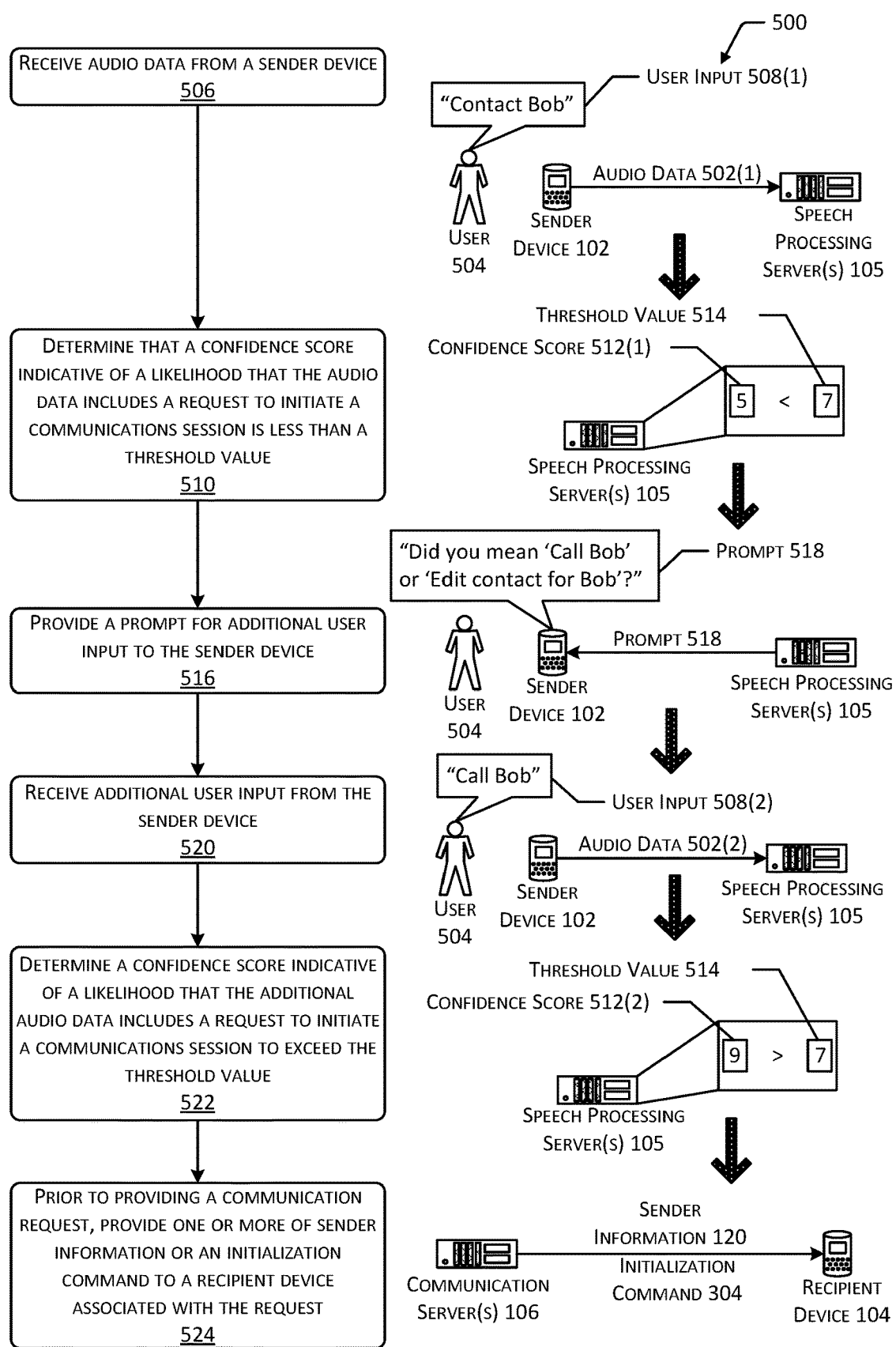
FIG. 5 depicts a method for establishing a communications session between a sender device and a recipient device based on audio data from a user indicating a command to initiate the communication.

FIG. 5 depicts a method 500 for establishing a communications session between a sender device 102 and a recipient device 104 based on audio data 502(1) from a user 504 indicating a command to initiate the communications session. At 506, audio data 502(1), input by a user 504, may be received from a sender device 102. For example, a sender device 102 may include a microphone or other type of audio input device that may receive user input 508(1) from the user 504. The user input 508(1) may include audible sound, such as a spoken command. Continuing the example, the user input 508(1) may include a command such as "Contact Bob". The sender device 102 may send audio data 502(1) indicative of the user input 508 to the speech processing server(s) 105. One or more language processing components associated with the speech processing server(s) 105 may process or analyze the audio data 502(1). For example, the language processing components may include speech-to-text components, natural language processing components, or other types of components configured to determine one or more commands, recipient information 108, or other information included in the user input 508(1). Continuing the example, the user input 508(1) "Contact Bob" may be determined to include a command (e.g., "contact") and recipient information 108 associated with a recipient device 104 (e.g., "Bob"). In other implementations, other types of user input 508, such as alphanumeric data, video data, image data, or haptic data may be received in lieu of or in addition to the audio data 502.

At 510, the speech processing server(s) 105 may determine a confidence score 512(1) indicative of the likelihood that the audio data 502(1) includes a request to initiate a communications session. The speech processing server(s) 105 may determine that the confidence score 512(1) is less than a threshold value 514. For example, the user input 508(1) "contact" may correspond to (e.g., at least partially match) multiple possible commands, or may not correspond to any existing command. In such cases, the confidence score 512(1) associated with the audio data 502(1) may be a low value because the intended command associated with the audio data 502(1) may not be able to be determined with a strong level of confidence.

At 516, a prompt 518 for additional user input 508(2) may be sent from the speech processing server(s) 105 to the sender device 102. In other implementations, the sender device 102 may be configured to output data corresponding to the prompt 518 without receiving such data from the communication server(s) 106. For example, responsive to user input 508(1) that includes a spoken utterance "Contact Bob", the speech processing server(s) 105 may determine that the user input 508(1) may include a command to initiate a communications session with a recipient device 104 corresponding to "Bob", or a command to modify contact data associated with recipient information 108 that includes the term "Bob". Responsive to this determination, the prompt 518 may present both of these possibilities and request user input 508(2) from the user 504 to clarify the intended command. For example, the prompt 518 may cause the sender device 102 to output text or an audible question, such as "Did you mean 'Call Bob' or 'Edit contact for Bob'?"

At 520, additional user input 508(2) may be received from the sender device 102. For example, the user 504 may provide additional user input 508(2), such as the utterance "Call Bob", responsive to which the sender device 102 may send audio data 502(2) corresponding to this user input 508(2) to the speech processing server(s) 105. At 522, the speech processing server(s) 105 may determine that a confidence score 512(2) indicative of a likelihood that the additional audio data 502(2) includes a request to initiate a communications session exceeds the threshold value 514. For example, the utterance "Call Bob" may directly match a particular command (e.g., "call"), and may not strongly match any other command, resulting in a high confidence score 512 associated with the audio data 502(2).

At 524, prior to sending a communication request 124 to the recipient device 104, the communication server(s) 106 may send one or more of sender information 120 or an initialization command 304 to the recipient device 104 that is associated with the communication request 124. For example, as described with regard to FIGS. 1-4, audio data 502 received from a sender device 102 may include recipient information 108 that corresponds to a particular recipient device 104. The recipient information 108 and sender contact data 110 may be used to determine a recipient profile identifier 116, which may be used to send data, such as sender information 120, initialization commands 304, and communication requests 124 to the recipient device 104. Subsequent to sending one or more of the sender information 120 or the initialization command 304 to the recipient device 104, a communication request 124 may be sent, responsive to which the recipient device 104 may accept the communication request 124, enabling a communications session between the sender device 102 and recipient device 104 to be initiated.

Figure 6:
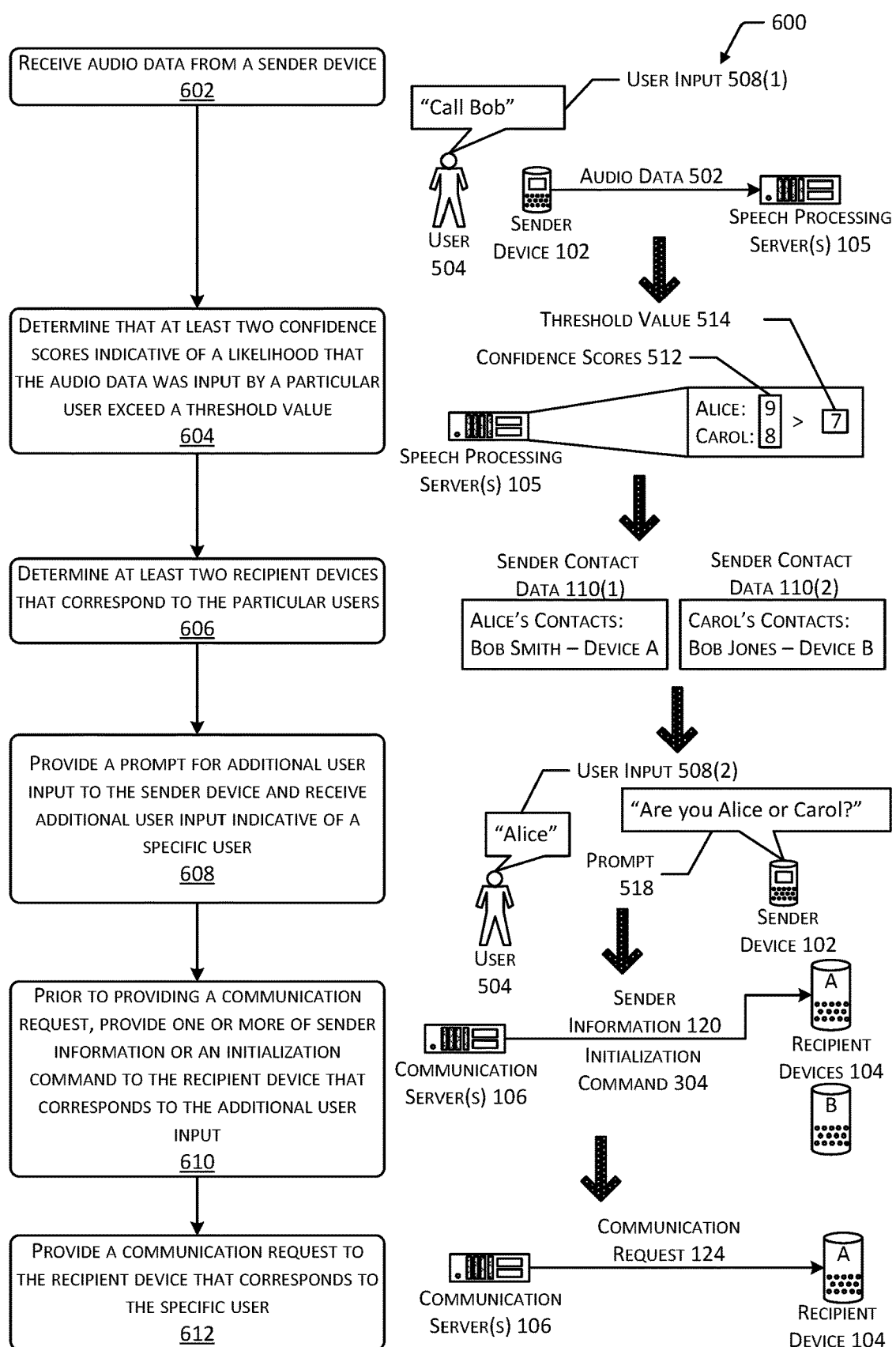
FIG. 6 depicts a method for establishing a communications session between a sender device and a recipient device in part by determining a specific user that provided audio data including a command to initiate the communications session.

FIG. 6 depicts a method 600 for establishing a communications session between a sender device 102 and a recipient device 104 in part by determining a specific user 504 that provided audio data 502 including a command to initiate the communications session. At 602, audio data 502 may be received from a sender device 102. For example, a user 504 may provide user input 508(1), such as the audible command "Call Bob". The sender device 102 may send audio data 502 indicative of the user input 508(1) to one or more speech processing server(s) 105.

At 604, the speech processing server(s) 105 may determine at least two confidence scores 512 indicative of the likelihood that the audio data 502 was input by a particular user 504. Each of the determined confidence scores 512 may exceed a threshold value 514. For example, a sender device 102 may be accessible by multiple users 504, and one or more of the sender device 102 or the communication server(s) 106 may be configured to attempt to identify a particular user 504 based on the received user input 508(1). Continuing the example, a first user (e.g., "Alice") and a second user (e.g., "Carol") may each be authorized to access a sender device 102. However, when user input 508(1) is received from a user 504, analysis of the user input 508(1) may result in a confidence score 512 greater than the threshold value 514 for both the first and second users 504.

At 606, the communication server(s) 106 may determine at least two recipient devices 104 that correspond to the particular users 504. For example, both the first user 504(1) ("Alice") and the second user 504(2) ("Carol") may have different sender contact data 110 associated therewith. For example, each user 504 may have a user account or other method by which the sender contact data 110 associated with a first user 504(1) may be differentiated from the sender contact data 110 associated with a second user 504(2). Continuing the example, when user input 508(1), such as the utterance "Call Bob" is received, a contact component 114 or other component associated with the communication server(s) 106 may determine a first recipient profile identifier 116(1) based on correspondence between the user input 508 and first sender contact data 110(1) associated with a first user 504(1) ("Alice"). The contact component 114 may determine a second recipient profile identifier 116(2) based on correspondence between the user input 508 and second sender contact data 110(2) associated with a second user 504(2) ("Carol"). For example, the first sender contact data 110(1) may include a first contact that corresponds to the utterance "Call Bob", such as "Bob Smith", while the second sender contact data 110(2) may include a second contact that corresponds to the utterance, such as "Bob Jones".

At 608, a prompt 518 may be sent to the sender device 102 to solicit additional user input 508(2) from the user 504. For example, a prompt 518 may include text or an audible prompt requesting that the user 504 clarify the identity of the sender. Continuing the example, the prompt 518 may include text or an audible output indicating "Are you Alice or Carol?", responsive to which the user 504 may send additional user input 508(2), such as the utterance "Alice". The additional user input 508(2) may be used to determine a specific recipient profile identifier 116 that corresponds to the audio data 502 and the sender contact data 110. For example, if the first contact data 110(1) is associated with the user "Alice", then the recipient profile identifier 116 may be determined based on correspondence between the recipient information 108 received from the user 504 and the recipient information 108 of the first sender contact data 110(1).

At 610, prior to sending a communication request 124, the communication server(s) 106 may send one or more of sender information 120 indicative of the sender or an initialization command 304 to initialize one or more components of the recipient device 104 to the recipient device 104 that corresponds to the additional user input 508(2). In other implementations, the communication server(s) 106 may send one or more of the sender information 120 or the initialization command 304 to each of the recipient devices 104 that correspond to at least one determined recipient user profile. In cases where the sender information 120 is provided to multiple recipient devices 104, neither of the recipient devices 104 may output the sender information 120 until a subsequent communication request 124 is received. Additionally, while multiple recipient devices 104 may receive initialization commands 304 and begin initializing one or more components, neither of the recipient devices 104 may indicate that the component(s) are being initialized until a subsequent communication request 124 is received. In some implementations, both sender information 120 and one or more initialization commands 304 may be sent to a recipient device 104. In other implementations, only one of the sender information 120 or the initialization command(s) 304 may be sent.

At 612, a communication request 124 may be sent to the recipient device 104 that corresponds to the specific user 504. For example, after determining the identity of the sending user 504 and the sender contact data 110 that corresponds to the receiving user 504, the particular recipient device 104 that is to receive the communication request 124 may be determined based on the sender contact data 110. When the recipient device 104 receives the communication request 124 subsequent to the sender information 120, the recipient device 104 may be configured to automatically accept the communication request 124, based on the sender information 120. Additionally, determination of the sender information 120 prior to receipt of the communication request 124 by the recipient device 104, rather than responsive to receipt of the communication request 124 by the recipient device 104 may enable a communications session to be initiated between the sender device 102 and recipient device 104 more rapidly. When the recipient device 104 receives the communication request 124 subsequent to the initialization command 304, one or more components of the recipient device 104 may already be at least partially initialized at the time that the communication request 124 is received. Initialization of components prior to receipt of the communication request 124 rather than responsive to receipt of the communication request 124 may enable the communications session to be initiated between the sender device 102 and recipient device 104 more rapidly.

In cases where sender information 120 or initialization commands 304 are sent to multiple recipient devices 104, a recipient device 104 other than the recipient device 104 that receives the communication request 124 may ignore or discard the received sender information 120 or initialization command 304. For example, in some implementations, the initialized component(s) may be deactivated. Continuing the example, an initialization command 304 may be configured to expire after a selected length of time. As another example, one or more components of a receiving device 104 may be configured to automatically reverse the initialization process after a particular length of time has passed. In some implementations, a command to cause a receiving device 104 to relinquish resources used to initialize a component may be sent to receiving devices 104 that received an initialization command 304 but did not receive a communication request 124.

Figure 7:
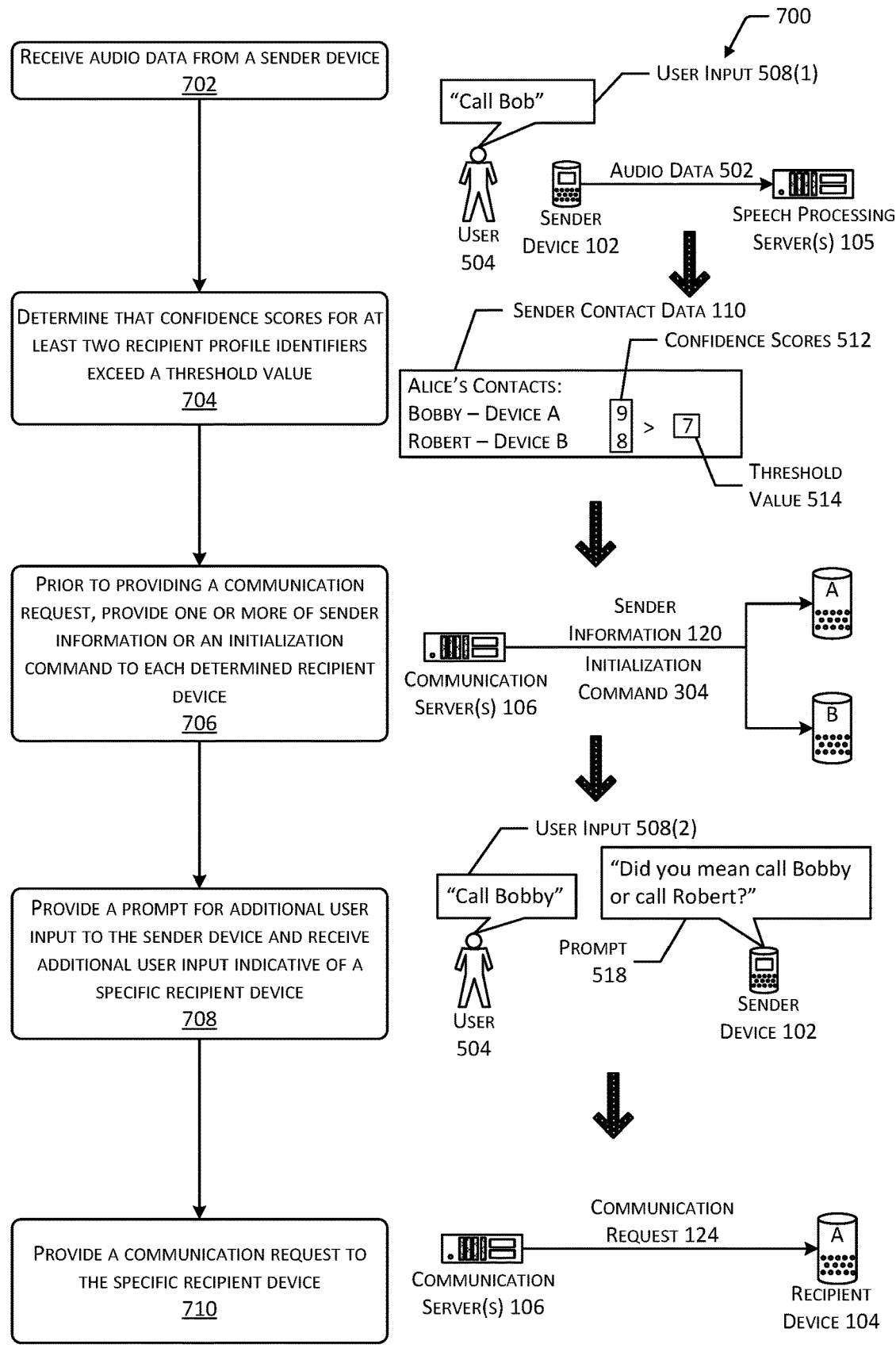
FIG. 7 depicts a method for establishing a communications session between a sender device and a recipient device in part by determining a specific recipient indicated in audio data from a sender.

FIG. 7 depicts a method 700 for establishing a communications session between a sender device 102 and a recipient device 104 in part by determining a specific recipient indicated in audio data 502 from a sender. At 702, audio data 502 may be received from a sender device 102. For example, a user 504 may provide user input 508(1) to the sender device 102, such as the audible command "Call Bob". The sender device 102 may send audio data 502 indicative of the user input 508(1) to one or more speech processing server(s) 105. In other implementations, data indicative of other types of user input 508, such as alphanumeric data, image data, video data, or haptic data may be received from the sender device 102.

At 704 the speech processing server(s) 105 may determine, based on the audio data 502, that confidence scores 512 for at least two recipient profile identifiers 116 exceed a threshold value 514. The confidence sores 512 may indicate the likelihood that the audio data 502 includes recipient information 108 that corresponds to a particular recipient profile. For example, a confidence score 512 may be determined based in part on the extent that the recipient information 108 associated with the audio data 502 matches recipient information 108 stored as sender contact data 110. Continuing the example, a user 504 may provide the user input 508(1) "Call Bob", in which the term "Bob" may be recipient information 108 indicative of a recipient profile. Sender contact data 110 associated with the sender user profile may include contacts associated with the recipient information 108 "Bobby" and "Robert". Due to the similarity between the terms "Bob" and "Bobby", a first confidence score 512 associated with the recipient profile identifier 116 for the term "Bobby" may exceed the threshold value 514. Similarly, due to the similarity between the terms "Bob" and "Robert", a second confidence score 512 associated with the recipient profile identifier 116 for the term "Robert" may exceed the threshold value 514.

At 706, prior to sending a communication request 124, the communication server(s) 106 may send one or more of sender information 120 associated with the sender user profile or an initialization command 304 to initialize one or more components of the recipient devices 104 to each of the determined recipient devices 104 that correspond to the recipient profile identifiers 116. In some implementations, both sender information 120 and one or more initialization commands 304 may be sent to a recipient device 104. In other implementations, only one of the sender information 120 or the initialization command(s) 304 may be sent.

At 708, a prompt 518 for additional user input 508(2) may be sent to the sender device 102. For example, a prompt 518 may include text or an audible prompt requesting that the user 504 clarify the identity of the recipient. Continuing the example, the prompt 518 may include the text or audible output "Did you mean call Bobby or call Robert?", responsive to which the user 504 may provide additional user input 508(2), such as the utterance "Call Bobby". The additional user input 508(2) may be used to determine a specific recipient profile identifier 116 that corresponds to the audio data 502. For example, the sender contact data 110 may associate the recipient information 108 "Bobby" with a particular recipient profile identifier 116 associated with a particular recipient device 104.

At 710, a communication request 124 may be sent to the recipient device 104 that corresponds to the recipient profile identifier 116. For example, after determining the identity of the intended recipient based on the recipient information 108, the communication request 124 may be generated and sent to the determined recipient device 104. When the recipient device 104 receives the communication request 124 subsequent to sender information 120, the recipient device 104 may be configured to accept the communication request 124, based on the sender information 120. When the recipient device 104 receives the communication request 124 subsequent to an initialization command 304, one or more components of the recipient device 104 may already be at least partially initialized at the time that the communication request 124 is received.

When a recipient device 104 other than the specific recipient device 104 determined at 708 is provided with sender information 120, but no subsequent communication request 124 is received by that recipient device 104, the sender information 120 may be disregarded or deleted by the recipient device 104. If a recipient device 104 other than the specific recipient device 104 determined at 708 is provided with an initialization command 304, but no subsequent communication request 124 is received by the recipient device 104, the initialized component(s) may be deactivated. In some implementations, a command to cause a receiving device 104 to relinquish resources used to initialize a component may be sent to receiving devices 104 that received an initialization command 304 but did not receive a communication request 124.

Figure 8:
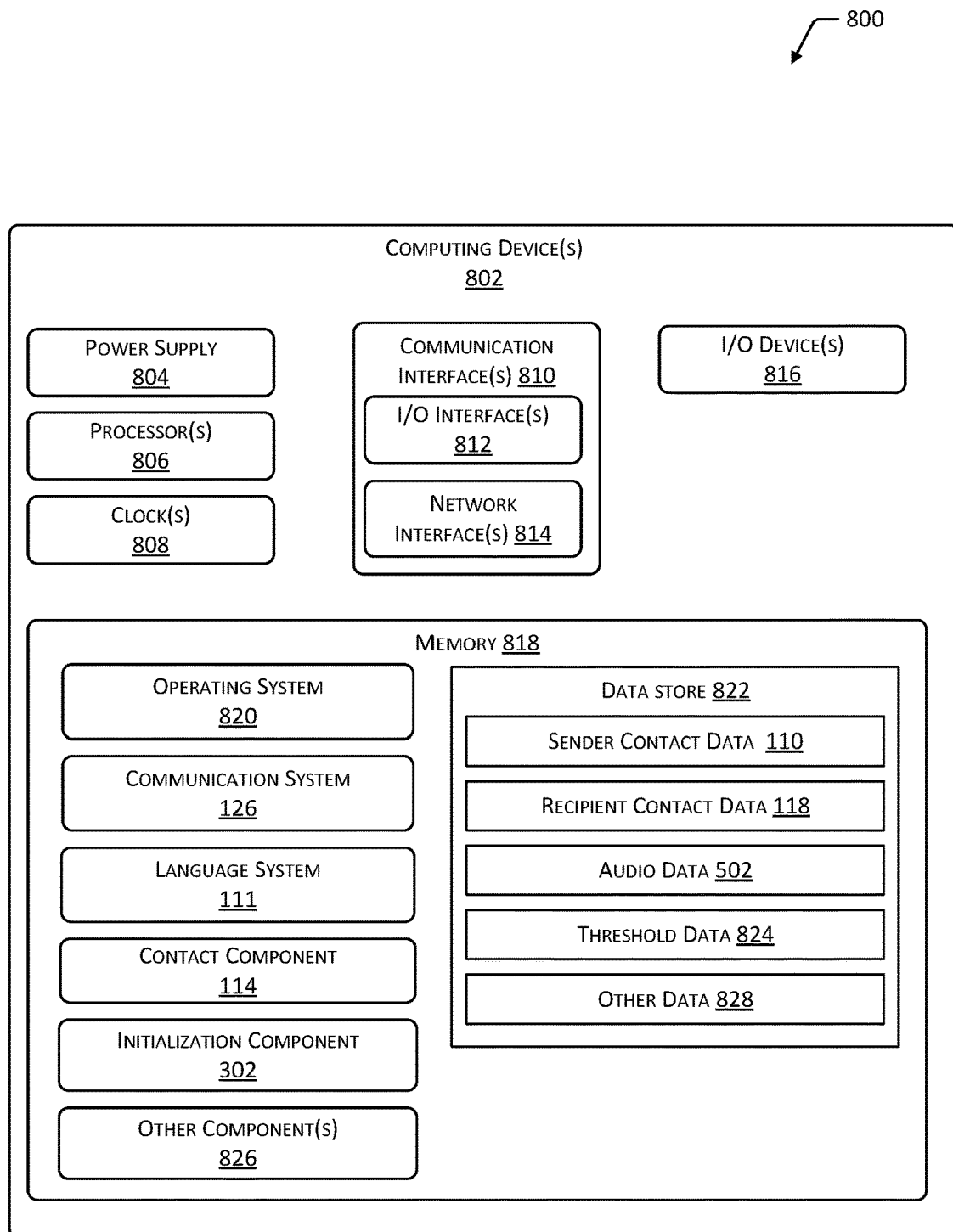
FIG. 8 is a block diagram depicting an implementation of a computing device within the scope of the present disclosure.

FIG. 8 is a block diagram 800 depicting an implementation of a computing device 802 within the scope of the present disclosure. While FIG. 8 depicts a single computing device 802, in other implementations, the functions described with regard to the computing device 802 may be performed by any number and any type of computing devices 802. For example, the computing device 802 may include one or more speech processing servers 105 or one or more communication servers 106. In other implementations, any combination of speech processing servers 105, communication servers 106, sender devices 102, recipient devices 104, or other computing devices 802 in communication therewith may perform the functions described herein.

One or more power supplies 804 may be configured to provide electrical power suitable for operating the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interface(s) 810, such as input/output (I/O) interface(s) 812, network interface(s) 814, and so forth. The communication interfaces 810 may enable the computing device 802, or components of the computing device 802, to communicate with other computing devices 802 or components thereof. The I/O interface(s) 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O device(s) 816. The I/O devices 816 may include any manner of input device or output device associated with the computing device 802 or with another computing device 802 in communication therewith. For example, I/O devices 816 may include touch sensors, keyboards, mouse devices, microphones, image sensors (e.g., cameras), scanners, displays, speakers, haptic devices, printers, motion sensors, location sensors, and so forth. In some implementations, the I/O device(s) 816 may be physically incorporated with a computing device 802 or may be externally placed.

The network interface(s) 814 may be configured to provide communications between the computing device 802 and other devices, such as the I/O devices 816, routers, access points, and so forth. The network interface(s) 814 may include devices configured to couple to one or more networks, including local area networks (LANs), wireless LANs, wide area networks (WANs), wireless WANs, and so forth. For example, the network interfaces 814 may include computing devices 802 compatible with Ethernet, Wi-Fi, Wi-Fi Direct, Bluetooth, Bluetooth Low Energy, ZigBee, Z-Wave, 3G, 4G, LTE, and so forth.

The computing device 802 may include one or more busses or other internal communications hardware or software that allows for the transfer of data between the various components and portions of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, programs, and other data for the operation of the computing device 802. A few example components and systems are shown stored in the memory 818, although the same functionality may alternatively be implemented in hardware, firmware, or as a system on a chip (SoC).

The memory 818 may include one or more operating system (OS) components 820. The OS 820 may be configured to manage hardware resource devices such as the I/O interfaces 812, the network interfaces 814, the I/O devices 816, and to provide various services to applications or components executing on the processors 806. The OS 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 822 and one or more of the following components or systems may also be stored in the memory 818. The components or systems may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

The memory 818 may include the communication system 126, which may be configured to establish communications sessions with the recipient device 104 or other computing devices 802. For example, the communication system 126 may be configured to generate SIP invitations or other types of communication requests 124, send the communication requests 124 to other computing devices 802, receive data from the other computing devices 802, such as SDPs or other configuration data, and in some cases, modify data from a first device before sending the data to a second device. For example, data received from a first device using a first configuration may be modified based on configuration data received from the second device. As described with regard to FIGS. 1 and 2, the communication system, 126 may also be configured to send sender information 120 or other data to a computing device 802 prior to sending a communication request 124.

The memory 818 may also store a language system 111. The language system 111 may be used to determine commands, recipient information 108 and other content based on user input 508 received from a user 504 or other computing device 802. For example, the language system 111 may include a speech-to-text component that may convert audio data 502 received from a user 504 or other computing device 802 to alphanumeric data (e.g., text). The language system 111 may also include a natural language processing component, which may determine commands, recipient information 108, and other information based on audio data 502 and other types of user input 508. In some implementations, the language system 111 may also determine confidence scores 512. For example, the language system 111 may determine a confidence score 512 indicating a likelihood that audio data 502 received from a sender device 102 includes a particular command, such as a command to initiate a communications session, a particular identification of a recipient, or that the audio data 502 was received from a particular sender. Continuing the example, the language system 111 may identify a particular speaker that provides audio user input 508 by comparing the user input 508 to a preexisting speech profile associated with one or more users 504, and may generate a confidence score 512 indicative of the likelihood that the speaker corresponds to a particular sender profile identifier 112. The confidence score 512 may be based on a degree of similarity between audio data 502 received from a user 504 and existing audio data 502. The language system 111 may also determine whether a confidence score 512 exceeds a threshold value 514 indicated in threshold data 824.

The memory 818 may additionally store the contact component 114. The contact component 114 may determine contact data that corresponds to a computing device 802 based on a device identifier associated with the computing device 802. For example, responsive to receiving data from a sender device 102 associated with a sender profile identifier 112, the contact component 114 may determine sender contact data 110 associated with the sender profile identifier 112. Based on contact data, the contact component 114 may determine profile identifiers that correspond to information received from a computing device 802, or information to send to a computing device 802 that corresponds to a profile identifier. For example, responsive to recipient information 108 received from a sender device 102, the contact component 114 may determine, based on the sender contact data 110, a recipient profile identifier 116 that corresponds to the recipient information 108. As another example, after determining recipient contact data 118 that corresponds to the identified recipient profile identifier 116, the contact component 114 may determine sender information 120 using the recipient contact data 118. For example, the sender profile identifier 112 associated with the sender device 102 may match a sender profile identifier 112 in the recipient contact data 118. This correspondence may indicate that the sender information 120 associated with the matched sender profile identifier 112 corresponds to the sender.

In some implementations, the contact component 114 may also determine confidence scores 512 based on the confidence of a match between information received from a computing device 802 and existing contact data. For example, a confidence score 512 may indicate likelihood that audio data 502 was received from a particular sender. As another example, a confidence score 512 may indicate a likelihood that audio data 502 from a sender references a particular recipient. The contact component 114 may determine whether particular confidence scores 512 exceed threshold values 514 indicated in the threshold data 824.

The memory 818 may also store the initialization component 302. The initialization component 302 may be configured to determine whether a command or other data received from a user 504 is associated with particular hardware or software components of a recipient device 104. For example, if a command to initiate a video communication is received, this command may be associated with a camera of the recipient device 104. The initialization component 302 may be configured to generate initialization commands 304 to be sent to computing devices 802 to cause the computing devices 802 to initialize one or more components thereof. The initialization commands 304 may be sent to computing devices 802 prior to sending a communication request 124 to the computing devices 802.

Other components 826 may also be present in the memory 818. For example, other components 826 may include a component for the determination of confidence scores 512, a user input component for receiving input to modify threshold data 824 or other configurations or parameters of the computing device 802, an encryption component to encrypt and decrypt communications between computing devices 802, and so forth. Other components 826 may also include systems for operation of cameras, audio components, wireless transceivers, and other elements of the computing device 802.

Other data 828 within the data store 822 may include default configurations and settings associated with computing devices 802. Other data 828 may also include security data, such as encryption keys and schema, access credentials, and so forth. Other data 828 may further include rules associating determined confidence scores 512 to threshold data 824, rules and algorithms for determining confidence scores 512 based on various metrics, and so forth.

In different implementations, different computing devices 802 may have different capabilities or capacities. For example, communication servers 106 may have significantly more processor 806 capability and memory 818 capacity compared to the processor 806 capability and memory 818 capacity of sender devices 102 or recipient devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

The invention claimed is:

1. A system comprising:
   one or more memories storing computer-executable instructions; and
   one or more hardware processors to execute the computer-executable instructions to:
   receive input from a first device, wherein the input is associated with a first profile;
   determine, based on the input, a command to initiate a communications session and information indicative of a second profile;
   determine the second profile that corresponds to the information of the command using first contact data associated with the first profile;
   determine second contact data that corresponds to the second profile;
   determine, based on correspondence between the first profile and the second contact data, information indicative of an identifier for the first profile that is stored in association with the second profile;
   send the information indicative of the identifier for the first profile to a second device associated with the second profile;
   generate a Session Initiation Protocol (SIP) invitation based on the first profile and the second profile;
   send the SIP invitation to the second device subsequent to sending the information indicative of the identifier for the first profile to the second device;
   cause the second device to output at least a portion of the information indicative of the identifier for the first profile;
   receive, from the second device, a communication acceptance; and
   responsive to the communication acceptance, initiate a SIP communications session between the first device and the second device.

2. The system of claim 1, wherein the input includes first audio input, the system further comprising computer-executable instructions to:
   determine a first confidence score based on correspondence between the first audio input and first audio data indicative of the first profile;
   determine a second confidence score based on correspondence between the first audio input and second audio data indicative of a third profile;
   determine that the first confidence score and the second confidence score exceed a threshold confidence score;

determine the second profile based on correspondence between the first audio input and the first contact data associated with the first profile;
determine a fourth profile based on correspondence between the first audio input and third contact data associated with the third profile;
send a first initialization command to the second device to cause the second device to initialize one or more components of the second device;
send a second initialization command to a third device associated with the fourth profile to cause the third device to initialize one or more components of the third device;
send a prompt for second audio input to the first device;
receive, from the first device, the second audio input;
determine that a third confidence score based on correspondence between the second audio input and the first audio data exceeds the threshold confidence score;
determine that a fourth confidence score based on correspondence between the second audio input and the second audio data is less than the threshold confidence score; and
send a command to the third device to cause the third device to relinquish resources associated with initialization of the one or more components of the third device.

3. The system of claim 1, further comprising computer-executable instructions to:
determine that the command associated with the input includes a command to initiate a video communications session;
responsive to the command, send a first initialization command to the first device to cause the first device to initialize one or more components of the first device; and
prior to sending the SIP invitation to the second device, send a second initialization command to the second device to cause the second device to initialize one or more components of the second device.

4. The system of claim 1, further comprising computer-executable instructions to:
determine, based on the correspondence between the information of the command and the first contact data, a plurality of profiles including the second profile;
send the at least a portion of the information indicative of the identifier for the first profile to a plurality of devices corresponding to the plurality of profiles, wherein the plurality of devices includes the second device; and
receive, from the first device, second input indicative of the second device, wherein the SIP invitation is generated responsive to the second input.

5. A method comprising:
receiving a command to initiate a communications session from a first device associated with a first profile;
determining a second profile associated with the command;
determining, using one or more computing devices, information indicative of the first profile based at least in part on contact data associated with the second profile;
sending, by the one or more computing devices during a first time period, at least a portion of the information indicative of the first profile to a second device associated with the second profile; and
sending, during a second time period that begins subsequent to a start of the first time period, a communication request to the second device associated with the second profile.

6. The method of claim 5, further comprising:
determining, based on acceptance data associated with the second profile, that the second profile is configured to automatically accept communication requests associated with the first profile; and
determining a communication acceptance associated with the second device responsive to correspondence between the acceptance data and one or more of the first profile or the information indicative of the first profile.

7. The method of claim 5, further comprising:
determining a communication acceptance associated with the second device responsive to the at least a portion of the information indicative of the first profile; and
initiating communication between the first device and the second device responsive to the communication acceptance.

8. The method of claim 5, further comprising:
receiving a communication acceptance from the second device prior to sending the communication request to the second device, wherein the communications session is automatically initiated upon receipt of the communication request by the second device responsive to the communication acceptance.

9. The method of claim 5, further comprising:
prior to sending the communication request, sending, to the second device, a command to cause the second device to initialize one or more of: at least one hardware component or at least one software application.

10. The method of claim 5, further comprising:
receiving first audio data from the first device;
determining information associated with a plurality of devices based on the first audio data;
sending the at least a portion of the information indicative of the first profile to the plurality of devices;
receiving second audio data from the first device; and
determining the second profile based on the second audio data, wherein the communication request is sent to the second device responsive to the second audio data.

11. The method of claim 5, wherein receiving the command from the first device includes:
receiving audio input from the first device;
determining a first confidence score associated with the second profile, based on correspondence between the audio input and first audio data indicative of the second profile; and
determining a second confidence score associated with a third profile based on correspondence between the audio input and second audio data indicative of the third profile; and
sending, during the first time period, information indicative of the first profile to a third device associated with the third profile.

12. The method of claim 5, further comprising:
receiving first configuration data indicative of communication parameters associated with the first device; and
receiving a communication acceptance from the second device, wherein the communication acceptance includes second configuration data indicative of communication parameters associated with the second device;
wherein the communications session between the first device and the second device is based on the first configuration data and the second configuration data.

13. A system comprising:
one or more memories storing computer-executable instructions; and one or more hardware processors to execute the computer-executable instructions to:
  receive a command to initiate a communications session between a first device associated with a first profile and a second device associated with a second profile;
  determine, using the one or more hardware processors, information associated with the first profile based on correspondence between the first profile and contact data associated with the second profile;
  send, using the one or more hardware processors, during a first time period, at least a portion of the information associated with the first profile to the second device;
  send, during a second time period that begins subsequent to a start of the first time period, a communication request to the second device;
  determine a communication acceptance associated with the second device; and
  initiate the communications session between the first device and the second device.

14. The system of claim 13, further comprising computer-executable instructions to:
  send first configuration data associated with the first device to the second device; and
  receive the communication acceptance from the second device, wherein the communication acceptance includes second configuration data associated with the second device;
  wherein the communications session includes communication parameters based on the first configuration data and the second configuration data.

15. The system of claim 13, further comprising computer-executable instructions to:
  cause the second device to output the at least a portion of the information associated with the first profile, wherein the communication acceptance is received from the second device responsive to the at least a portion of the information associated with the first profile.

16. The system of claim 13, further comprising computer-executable instructions to:
  determine, based on acceptance data associated with the second profile, that the second profile is configured to automatically accept communication requests associated with the first profile;
  wherein the communication acceptance is determined based on correspondence between the acceptance data and one or more of the first profile or the information associated with the first profile.

17. The system of claim 13, further comprising computer-executable instructions to:
  receive first input from the first device, wherein the first input is indicative of a plurality of devices that includes the second device;
  send the at least a portion of the information associated with the first profile to the plurality of devices; and
  receive second input from the first device, wherein the second input indicates the second device;
  wherein the communications session is initiated based in part on the second input.

18. The system of claim 13, further comprising computer-executable instructions to:
  receive, from the first device, first audio data indicative of the command;
  determine, based on the first audio data, one or more confidence scores indicative of a plurality of profiles, wherein the information associated with the first profile is associated with the plurality of profiles; and
  receive, from the first device, second audio data indicative of the first profile;
  wherein the information associated with the first profile is determined in response to receiving the second audio data.

19. The system of claim 13, further comprising computer-executable instructions to:
  subsequent to receiving the communication acceptance from the second device, send a communication request to the second device, wherein the communications session is automatically initiated upon receipt of the communication request by the second device based on the communication acceptance.

20. The system of claim 13, further comprising computer-executable instructions to:
  receive audio data from the first device;
  determine, based on the audio data, the command and information indicative of the second profile; and
  determine the second profile based on correspondence between the information indicative of the second profile and contact data associated with the first profile.

* * * * *